United States Patent [19]

Sarraf

[11] Patent Number: 5,066,962
[45] Date of Patent: Nov. 19, 1991

[54] LASER THERMAL PRINTER HAVING A LIGHT SOURCE PRODUCED FROM COMBINED BEAMS

[75] Inventor: Sanwal P. Sarraf, Webster, N.Y.

[73] Assignee: Eastman Kodak Company, Rochester, N.Y.

[21] Appl. No.: 457,593

[22] Filed: Dec. 27, 1989

[51] Int. Cl.⁵ .............................................. H04N 1/23
[52] U.S. Cl. ............................ 346/76 L; 346/76 PH; 346/108
[58] Field of Search ................. 346/76 L, 76 PH, 108

[56] References Cited

U.S. PATENT DOCUMENTS

| | | | |
|---|---|---|---|
| 4,245,228 | 1/1981 | Cook | 346/108 |
| 4,520,370 | 5/1985 | Fujii et al. | 346/76 L |
| 4,530,080 | 7/1985 | Aoi et al. | 369/45 |
| 4,542,392 | 9/1985 | Schulz-Henning | 346/160 |
| 4,547,784 | 10/1985 | Erlichman et al. | 346/76 PH |
| 4,631,551 | 12/1986 | Vergona | 346/108 |
| 4,651,170 | 3/1987 | Chandler et al. | 346/108 |
| 4,694,447 | 9/1987 | Cohen et al. | 369/110 |
| 4,728,965 | 3/1988 | Kessler et al. | 346/108 |
| 4,744,073 | 5/1988 | Sugiki | 369/112 |
| 4,760,407 | 7/1988 | Arimoto et al. | 346/108 |
| 4,791,591 | 12/1988 | Asanuma et al. | 364/571.04 |
| 4,804,975 | 2/1989 | Yip | 346/76 L |
| 4,804,977 | 2/1989 | Long | 346/76 L |
| 4,833,124 | 5/1989 | Lum | 503/227 |
| 4,853,709 | 8/1989 | Stein et al. | 346/108 |
| 4,903,042 | 2/1990 | Käufl et al. | 346/76 L |
| 4,961,079 | 10/1990 | Owens et al. | 346/108 |

Primary Examiner—Benjamin R. Fuller
Assistant Examiner—Victor DeVito
Attorney, Agent, or Firm—Donald D. Schaper

[57] ABSTRACT

A thermal printer is disclosed which is particularly suitable for making slide transparencies. The printer includes a laser which provides the necessary energy to effect a transfer of dye from a donor element to a receiver element. In order to insure the transfer of dye from the donor at a suitable resolution and with sufficient speed, two relatively high-powered single transverse mode lasers are used. The beam from one of the lasers is passed through a half-wave plate, and the beam is then combined with the beam from the other laser by a polarization beam splitter. The combined beam is passed through suitable optics and is scanned onto the receiver element by a galvonometer.

15 Claims, 4 Drawing Sheets

LASER THERMAL PRINTER HAVING A LIGHT SOURCE PRODUCED FROM COMBINED BEAMS

CROSS REFERENCE TO RELATED APPLICATION

Reference is made to U.S. patent application, Ser. No. 457,595, entitled "Thermal Printer", filed in the name of S. Sarraf et al. on even date herewith; this application is assigned to the assignee of the present invention.

BACKGROUND OF THE INVENTION

1. Field of the Invention

This invention relates to a thermal printer, and more particularly, to such a printer in which lasers are used to provide the energy necessary to effect dye transfer in a thermal medium.

2. Description of the Prior Art

In one type of thermal printer, a dye-donor element is placed over a dye-receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known in thermal printing to use lasers instead of resistors to effect the transfer of dye from a donor element to a receiver element. In U.S. Pat. No. 4,804,975, for example, there is shown thermal dye transfer apparatus which comprises an array of diode lasers which can be selectively actuated to direct radiation onto a dye-carrying donor. Radiation from the diode lasers is modulated in accordance with an information signal to form an image on a thermal print medium. The diode laser array extends the full width of the print medium. One problem with this apparatus is that it is too expensive for many applications. The initial cost of such a large array is relatively high, and failure of only one diode laser in the array will result in discarding the entire array. A further problem with the patented apparatus is that it is difficult to obtain the density and resolution needed for a high-quality image.

When a diode laser is used for high-resolution thermal printing, the output from the laser diode must be focused to a small spot. As noted in the aforementioned U.S. patent application, it has been found that a single transverse mode coherent laser, having a Gaussian type output, can be used to produce a diffraction limited spot on the thermal medium. One problem of using such a laser in some applications is that the lasers emit at relative low power, and thus, the writing speed of the printer is limited.

SUMMARY OF THE INVENTION

It is an object of the present invention to overcome the problems discussed above in the prior art and to provide an improved thermal printer for use in producing high-resolution image in a relatively high speed printer.

In accordance with one aspect of the invention, there is provided a thermal printer for forming an image on a thermal medium, the printer comprising: means for supporting a thermal medium; means for driving the supporting means; a light source which includes a pair of diode lasers; means for modulating the diode lasers in accordance with an information signal; means for combining the modulated beams to form a combined beam; optical means for shaping the combined beam; means for receiving the combined beam from the optical means and for scanning the combined beam across the medium; and means for controlling the scanning means, the modulating means, and the driving means in timed relation to each other.

In one embodiment of the present invention, a donor element in the form of a web is supported in contact with a receiver element which is mounted on a rotatable drum for movement with the web. The donor and receiver elements are moved in the page scan direction, and a galvanometer moves a laser beam across the donor element in the scan direction. The beams from two diode lasers, which are driven in accordance with an information signal, are combined and the combined beam is supplied to the galvonometer through beam shaping optics. The beam from the galvanometer passes through an f-$\theta$ lens.

The thermal printer of the present invention is particularly suitable for producing slides in a standard slide format. Both transferred and retained images can be written in the printer. Bimodal as well as continuous tone images can be produced, and the printer can be used to make both reflection images and transparencies. The writing speed of the printer can be substantially higher as a result of the high power beam obtained from the combination of the two laser beams.

Other features and advantages will become apparent upon reference to the following description of the preferred embodiment when read in light of the attached drawings.

DESCRIPTION OF THE PREFERRED EMBODIMENT

Figure 1:
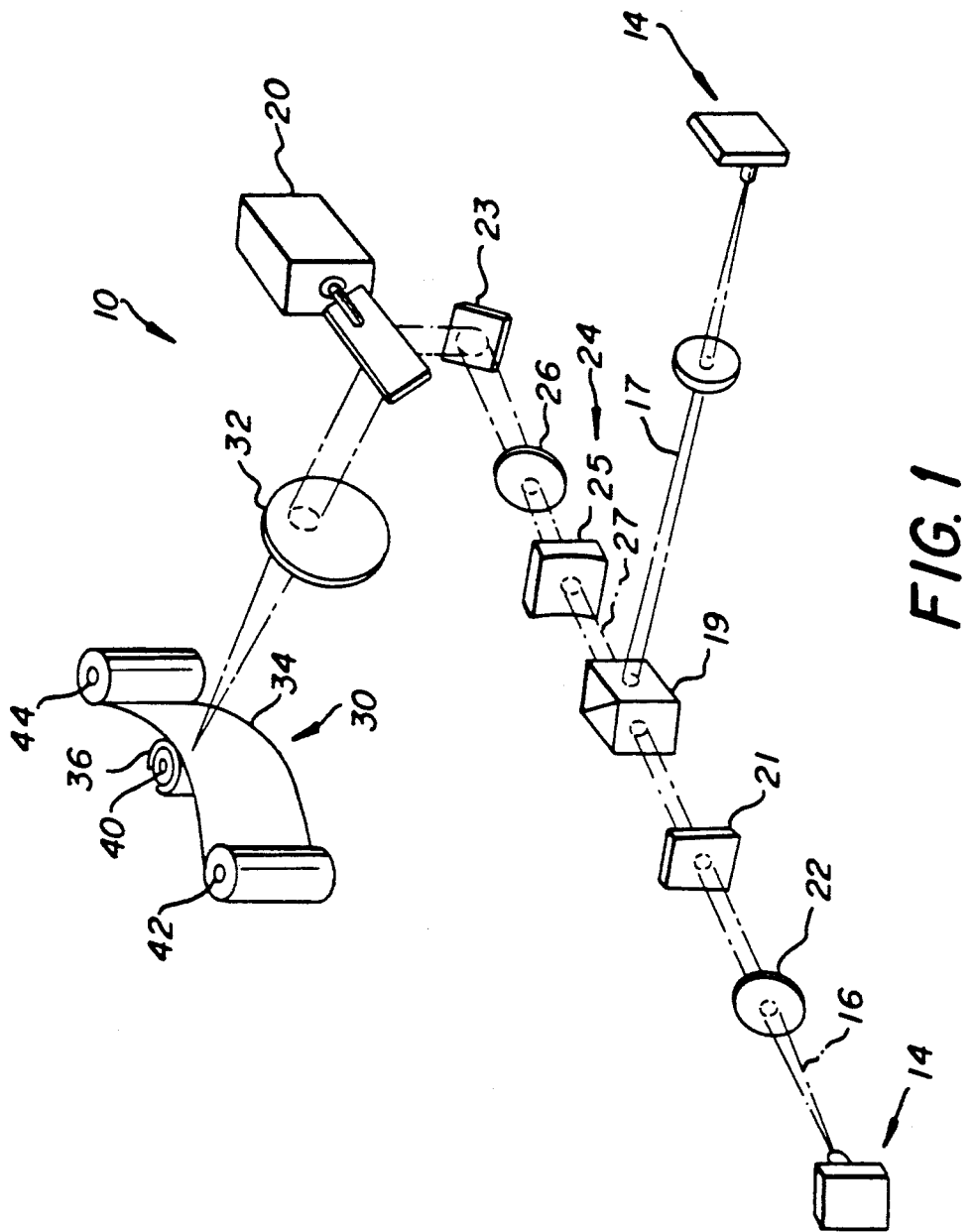
FIG. 1 is a schematic perspective view of the thermal printer of the present invention.

With reference to FIG. 1, there is shown a thermal printer 10 constructed in accordance with the present invention. Printer 10 comprises a pair of optical heads 14 which produce laser beams 16 and 17. The beams 16 and 17 are modulated in accordance with an information signal. Beam 16 is directed to a polarization beam splitter 19 through a collimating lens 22 and a half-wave plate 21. Beam 17 is directed to beam splitter 19 through a collimating lens 22.

The laser beams 16 and 17 are generally linearly polarized, and both of the beams are collimated and have similar beam profiles. The polarization of beam 16 is rotated 90° by passing through half-wave plate 21, but the profile of beam 16 is not altered by the half-wave plate. Since the polarizations of beams 16 and 17 are orthogonal at polarization beam splitter 19, beam 16 is transmitted by beam splitter 19 and beam 17 is reflected by the beam splitter. Beam splitter 19 is disposed to superimpose beams 16 and 17, and the superimposed beams propagate coaxially and coangularly as a combined beam 27. Due to the orthogonal polarization of beams 16 and 17, there is no phase interaction of these beams and only the amplitude is augmented.

Combined beam 27 is directed to a galvanometer 20 through beam shaping optics 24, and a turning mirror 23. Beam shaping optics 24 includes a pair of cylindrical lenses 25 and 26. Galvanometer 20 is adapted to scan the beam 16 onto a thermal print medium 30. The beam 16 from galvanometer 20 passes through an f-θ lens 32 which functions in a well-known manner to maintain a flat field and a constant velocity of the scanned spot on the thermal print medium.

The thermal print medium 30 is of a type in which a dye is transferred by sublimation from a donor element 34 to a receiver element 36 as a result of heating the dye in the donor. As shown in FIG. 1, receiver element 36 is attached to a rotatable drum 40 for movement therewith, and donor element 34 is in the form of a web which extends between a supply roll 42 and a take-up roll 44. Receiver element 36 can be removably attached to drum 40 by any suitable means, for example, by means of a vacuum. Drum 40 and rolls 42 and 44 can be driven, for example, by stepper motors (not shown) which are actuated in timed relation to the movement of galvanometer 20.

A thermal print medium which can be used to produce a transferred image in printer 10 can be, for example, a medium disclosed in U.S. Pat. No. 4,833,124, entitled "Process of Increasing the Density of Images Obtained by Thermal Dye Transfer," granted May 23, 1989. This patent is assigned to the assignee of the present invention. As disclosed in U.S. Pat. No. 4,833,124, the thermal print medium includes a donor element having a material which strongly absorbs at the wavelength of the laser. When the donor element is irradiated, this absorbing material converts light energy to thermal energy and transfers the heat to the dye to its vaporization temperature for transfer to the receiver element. The absorbing material may be present in a layer beneath the dye or it may be admixed with the dye. The laser beam is modulated by electronic signals, which are representative of the shape and color of the original image, so that each dye is heated to cause volatilization only in those areas in which its presence is required on the receiver element to reconstruct the color of the original object.

A thermal print medium of the type which produces a retained image can also be used in printer 10. In such a medium, no donor element is used, and a receiver element contains a dye layer. An image is formed by using the laser beam 16 to remove dye from selected areas on the receiver element.

Figure 2:
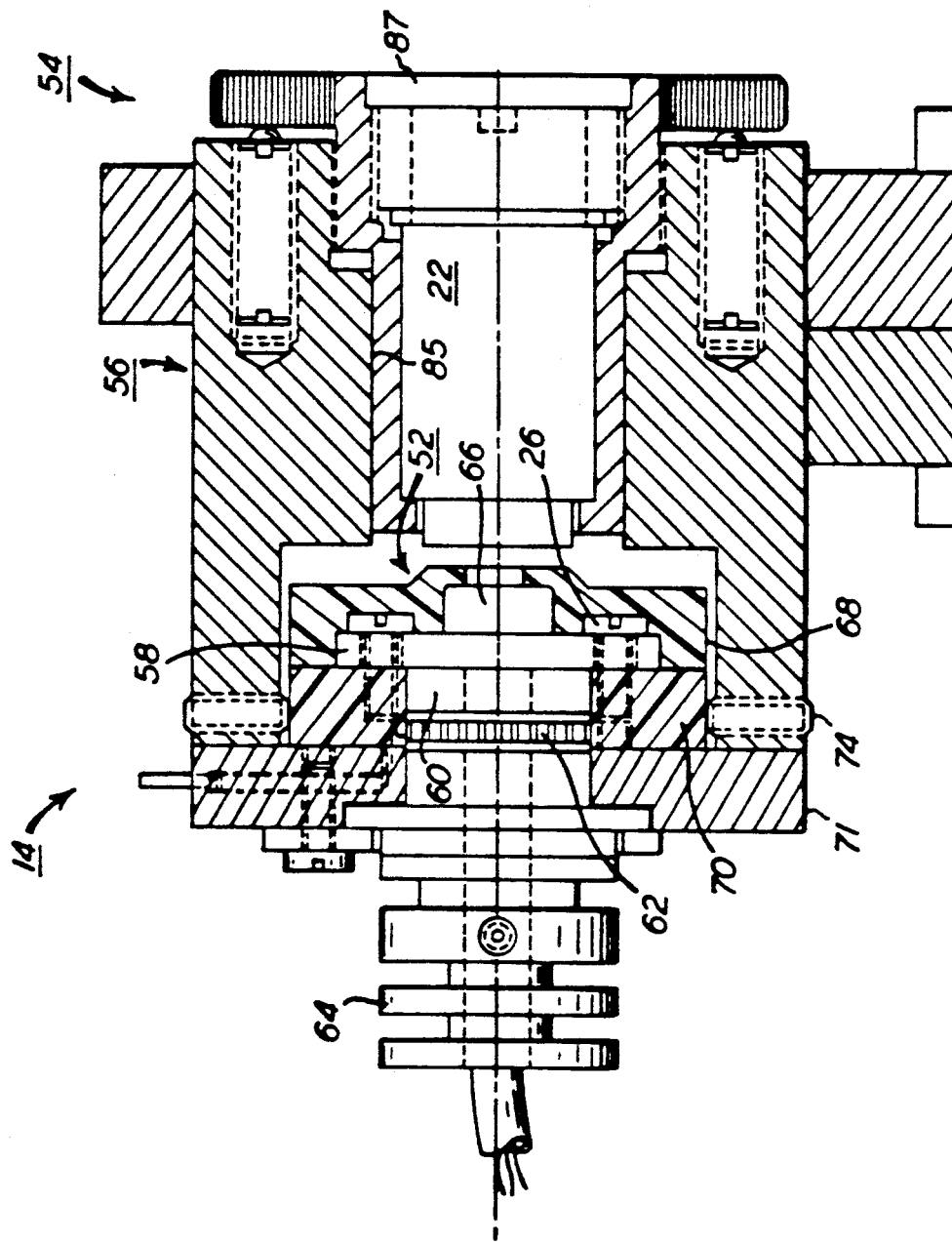
FIG. 2 is a side elevational view of an optical head which can be used in the present invention, with certain parts shown in section.

Each of the optical heads 14 can be constructed as shown in FIG. 2. Such a head is disclosed in detail in U.S. patent application Ser. No. 238,225, entitled Athermalized Optical Head, filed Aug. 30, 1988, in the name of Thomas E. Yates. The disclosure in application Ser. No. 238,225 is expressly incorporated herein by reference. Optical head 14 comprises a light source 52 and an optical device 54, both of which are supported in a tubular support 56. Light source 52 includes a diode laser 58, a thermal transfer plate 60, a thermoelectric cooling element 62, and a heat sink 64. Diode laser 58 is surrounded at an output side 66 by a cover 68 which is formed of an insulator material, such as No. 106 silicone, obtainable from the RTV Corp. Diode laser 58 is mounted by means of fasteners 26 to an insulator ring 70 which is made of glass-filled polycarbonate, for example, such a material sold under the trademark Lexan 3414 by General Electric Co. Insulator ring 70 is mounted to an annular laser mount 71 by means of fasteners (not shown). Laser mount 71 can be, for example, copper. Set screws 74 in support 56 are threaded into contact with insulator ring 70 to align light source 52 relative to optical device 54. Heat from diode laser 58 is transferred to heat sink 64 which expels the excess heat through a finned radiator (not shown) to the environment.

Optical device 54 includes a lens housing 85 which is adapted to receive collimating lens 22 and a threaded lens retainer 87. Diode laser 58 and lens 22 are mounted in optical head 14 such that the distance between the diode laser and the lens is maintained constant over a predetermined temperature range.

Figure 3:
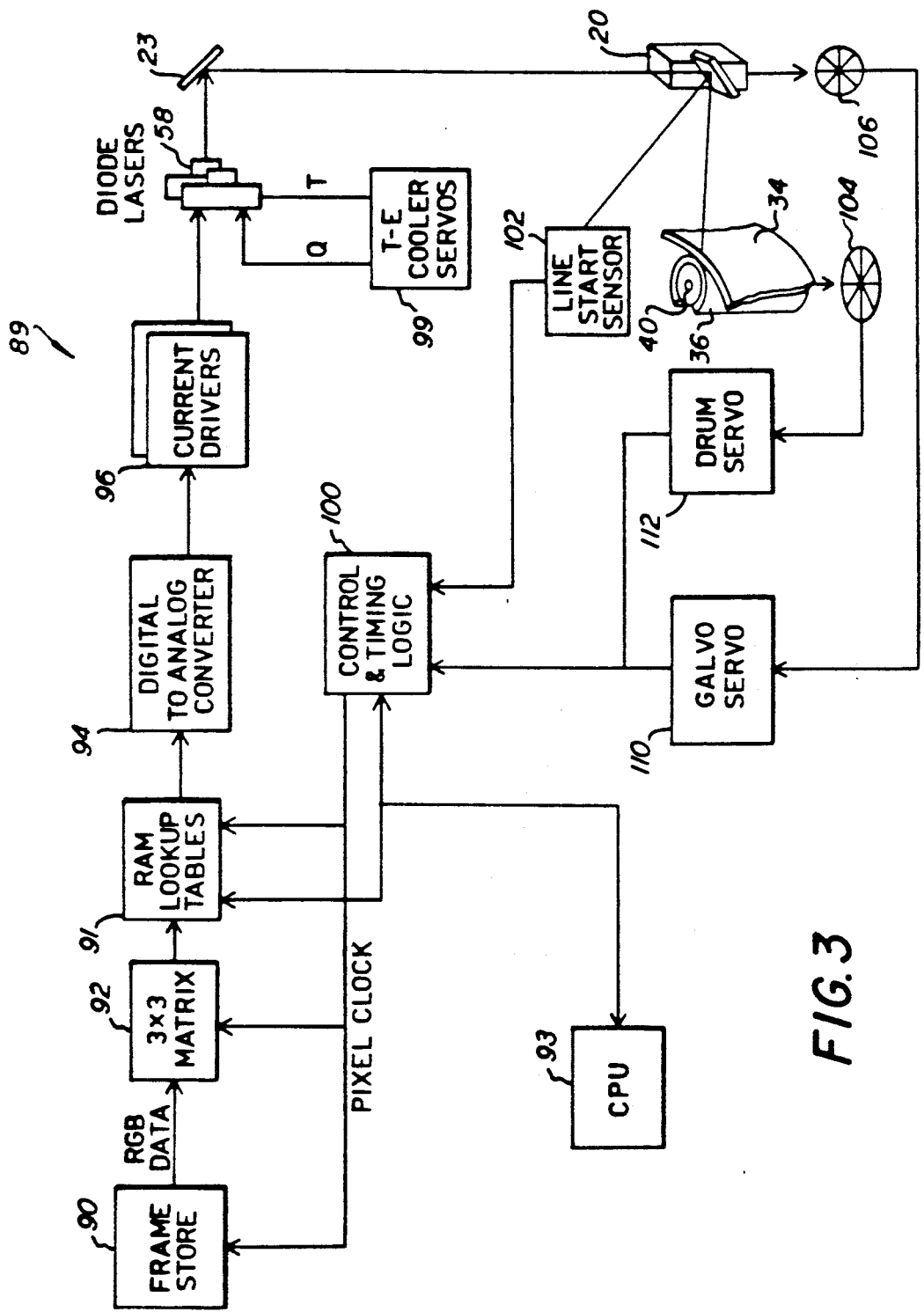
FIG. 3 is a block diagram of the electronic elements in the present invention.

A control system 89 for printer 10 is shown in FIG. 3. Control system 89 comprises a frame store 90 for storing image data received from an image scanner (not shown) or from an image storage medium (not shown). The data stored in frame store 90 includes, for example, three 8-bit values for each pixel, each value representing the red, green, or blue input for the pixel. A matrix multiplication circuit 92 multiplies the 8-bit red, green, and blue values by a 3×3 matrix in order to effect desired color corrections.

The output from circuit 92 is applied to RAM lookup tables 91 which perform the necessary scaling for linearization and calibration. Updated values for the lookup tables 91 can be provided by a central processing unit 93. The digital outputs from lookup tables 91 are provided to a digital-to-analog (D/A) converter 94, and the outputs from the D/A converter drive the voltage-to-current drivers 96 for the diode lasers 58. A thermoelectric cooler for the diode laser 58 is controlled by a thermoelectric cooler servo 99.

In one embodiment of the present invention, the same information signal is provided to each of the drivers 96. In certain applications, it is possible to drive one of the lasers 58 with a constant D.C. signal, which would be below the threshold necessary to produce a dye transfer, and to provide the information signal to the other laser 58. It is also possible to drive one, or both, of the lasers 58 with a D.C. signal to preheat the thermal medium or to postheat the medium after an image has been formed thereon.

A control and timing logic circuit 100 is provided to manage the data flow during the operation of printer 10 and to control the printer timing. Circuit 100 accepts timing signals from a drum servo 112, a galvanometer servo 110, and an optical fiber line start sensor 102, and uses these signals to synchronize the printing operations. These timing signals include a once-per-revolution pulse from drum servo 112 which receives inputs from an encoder 104, a once-per-cycle pulse from servo 110 which receives inputs from an encoder 106, and a line-start pulse that is generated when the laser beam crosses an optical fiber (not shown) in line start sensor 102. Upon receipt of these signals, a pixel clock is started and the data is clocked through the data circuits. Also included in circuit 100 are a pixels-per-line counter for line length control and a counter for controlling the addressing of the lookup tables 91.

In one illustrative embodiment of the present invention, each of the diode lasers 58 is a Model No. HL8351E, obtainable from the Hitachi Corp.; this laser is a 50 mw single transverse mode coherent laser which emits radiation at 830 nm. Each of the collimating lenses 22 is an NRC Model F-L20; lens 22 has a focal length of 8.6 mm and a numerical aperture of 0.5. Half-wave plate 21 is a quartz half-wave plate for 830 nm, Model No. 02WRQO25, obtainable from Melles Griot Co. Polarization beam splitter 19 is a Model No. 03PBS067, obtainable from Melles Griot Co. Cylindrical lens 25 has a focal length of −80.0 mm and is a No. 01LCN135, obtainable from Melles Griot Co. Cylindrical lens 26 has a focal length of 250.0 mm, and is a No. 01LCP135, obtainable from Melles Griot Co. Galvanometer 20 is a Model No. 325 DT, manufactured by General Scanning Co. F-$\theta$ lens 32 has a focal length of 71 mm, and is a No. I-4921, made by D.O. Industries.

As noted above, each of the diode lasers 58 delivers 50 mw of coherent radiation in a single transverse mode. The Gaussian outputs of the lasers 58 are combined by beam splitter 19, and the combined beam 27 can be focused to a diffraction limited spot. This optical characteristic of the laser along with the disclosed optics makes it possible to obtain very high resolution in printer 10. A very high resolution is needed in transparencies in order to obtain a desired sharpness in a projected image. In one exemplary use of the present invention, where the laser beam 27 is focused to a 7 μm (FWHM) spot on the medium 30 and the spots are written at a pitch of 6 μm, a resolution of 4000 spots per inch can be obtained. Since the spot size can be varied, a higher or lower resolution can be obtained, if desired. It is also contemplated that lasers having a higher output could be used in the printer of the present invention, for example, lasers having an output of between 50 mw and 100 mw.

After an image has been formed on a receiver as described herein, it is desirable for certain mediums to apply heat to the receiver to fuse the image. One suitable way to fuse the image is to apply hot air at 120° C. to the image for approximately two minutes.

Printer 10 can be used to form slide transparencies in a number of different ways. In the use of a medium of a type which forms a transferred image, a monochrome image can be produced by passing donor 34 in contact with receiver 36 during a single pass, that is, during one revolution of drum 40. The receiver 36, which in this case is a transparent film, would then be removed from drum 40 and mounted in a suitable slide mount. If a color image is desired, the donor 34 would include separate spaced sections, for example, cyan, magenta, and yellow sections, and these sections would successively contact receiver 36 in separate passes of the drum 40. In the use of a medium of the type which forms a retained image, an monochrome image can be formed by one revolution of drum 40. It is also possible to make a color image using either type of medium by forming three separate images, one for cyan, one for yellow, and one for magenta, on three separate receivers 36; the three receivers would then be laminated to form a slide.

Figure 4:
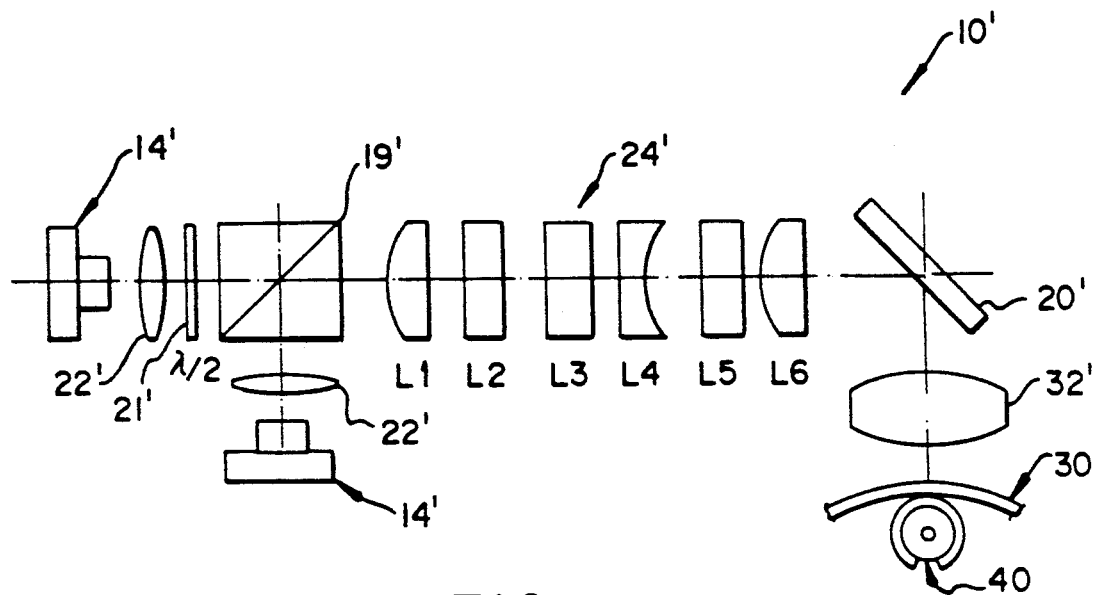
FIG. 4 is a top plan view of a second embodiment of the present invention.
Figure 5:
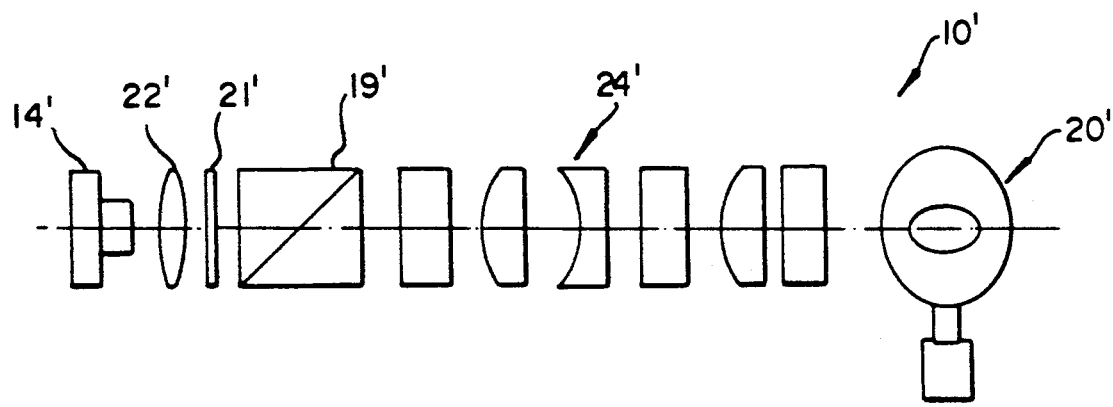
FIG. 5 is a side elevational view of the embodiment shown in FIG. 4.

A second embodiment of the present invention is shown in FIGS. 4 and 5. As shown in these figures, a thermal printer 10' is generally similar to printer 10 and like elements in printer 10' have been given the reference numeral of the corresponding element in printer 10 with a prime added. Printer 10' differs from printer 10 in that the beam shaping optics 24' in printer 10' are different from optics 24 in printer 10. Beam shaping optics 24' includes cylindrical lenses L1-L6. The lenses L1-L6 are used in a zoom lens to vary the spot size on the medium. In one representative example of printer 10', cylindrical lenses L1-L6 can be lenses manufactured by Melles Griot Co. which have the following focal lengths and part numbers:

| Lens | Focal Length (mm) | Part No. |
| --- | --- | --- |
| L1 | 250 | 01LCP135 |
| L2 | 100 | 01LCP155 |
| L3 | −25.4 | 01LCN126 |
| L4 | −80 | 01LCN135 |
| L5 | 100 | 01LCP155 |
| L6 | 250 | 01LCP135 |

This invention has been described in detail with particular reference to the preferred embodiment thereof, but it will be understood that variations and modifications can be effected within the spirit and scope of the invention. For example, although the present invention has been described herein in relation to a thermal printer, it will be apparent that the invention could be used in other applications where enhanced laser power is required.

I claim:

1. A thermal printer for forming an image on a thermal medium, said printer comprising:
    means for supporting a thermal medium;
    means for driving said supporting means;
    a light source which includes a pair of diode lasers;
    means for modulating said diode lasers in accordance with an information signal to produce modulated beams;
    means for combining said modulated beams to form a combined beam;
    optical means for shaping said combined beam;
    means for scanning said combined beam across said medium; and
    means for controlling said scanning means, said modulating means, and said driving means in timed relation to each other, said controlling means including means for controlling said modulating means so that said combined beam contains a single information signal.

2. A thermal printer, as defined in claim 1, wherein said combining means is a polarization beam splitter.

3. A thermal printer, as defined in claim 2, wherein a half-wave plate is interposed between one of said lasers and said beam splitter.

4. A thermal printer, as defined in claim 3, wherein said optical means includes a pair of cylindrical lenses.

5. A thermal printer, as defined in claim 4, wherein said optical means includes a zoom lens.

6. A thermal printer for forming an image on a thermal medium, said medium including a dye is transferred by sublimation from a donor to a receiver as a result of heating the dye in the donor, said printer comprising:
    means for supporting a thermal medium, said supporting means including means for supporting a donor element and means for supporting a receiver element;
    means for driving said means for supporting a thermal medium;
    a light source which includes a pair of diode lasers;

means for modulating said diode lasers in accordance with an information signal to produce modulated beams;

means for combining said modulated beams to form a combined beam;

optical means for shaping said combined beam;

means for scanning said combined beam across said medium; and means for controlling said scanning means, said modulating means, and said driving means in timed relation to each other, said controlling means including means for controlling said modulating means so that said combined beam contains a single information signal.

7. A thermal printer, as defined in claim 6, wherein each of said diode lasers is a single transverse mode coherent laser.

8. A thermal printer, as defined in claim 7, wherein each of said coherent lasers produces power in a range between about 50 mw and about 100 mw.

9. A thermal printer, as defined in claim 6, wherein said scanning means is a galvanometer.

10. A thermal printer for forming an image on a thermal medium, said printer comprising:

means for supporting a thermal medium;

means for driving said supporting means to move said medium in a cross-scan direction;

a light source which includes a pair of diode lasers for producing a pair of laser beams;

means for driving said lasers to modulate at least one of said beams in accordance with an information signal;

a polarization beam splitter for combining said beams to form a combined beam, said combined beam containing a single image-forming signal;

a half-wave plate interposed in one of said laser beams between a laser and said beam splitter;

optical means for shaping said combined beam;

means for scanning said combined beam across said medium; and means for controlling said scanning means, said modulating means, and said driving means in timed relation to each other.

11. A thermal printer, as defined in claim 10, wherein one of said beams is modulated in accordance with an information signal provided to said driving means.

12. A thermal printer, as defined in claim 10, wherein both of said beams are modulated in accordance with an information signal provided to said driving means.

13. A thermal printer, as defined in claim 11, wherein the other of said beams is produced by a D.C. signal to said driving means.

14. A thermal printer, as defined in claim 10, wherein said driving means includes means for removing power from one of said diode lasers and means for providing power to the other diode laser at a level necessary to preheat or postheat said medium.

15. A printer, as defined in claim 10, wherein each of said beams at said beam splitter is of an identical wavelength and of a different polarization.

* * * * *